(12) United States Patent
Liao et al.

(10) Patent No.: US 10,728,406 B1
(45) Date of Patent: Jul. 28, 2020

(54) HOLDING DEVICE FOR MOBILE DEVICE

(71) Applicant: Foxlink Image Technology Co., Ltd., New Taipei (TW)

(72) Inventors: Wen Chu Liao, New Taipei (TW); Yen Ya Wu, New Taipei (TW); Yun Long Lai, New Taipei (TW)

(73) Assignee: Foxlink Image Technology Co., Ltd., New Taipei City ( * ) Notice: Subject to any disclaimer, the term of this patent is extended or adjusted under 35 U.S.C. 154(b) by 0 days.

(21) Appl. No.: 16/423,234

(22) Filed: May 28, 2019

(30) Foreign Application Priority Data

Mar. 8, 2019 (TW) .............................. 108202775 U

(51) Int. Cl.
*H04N 1/04* (2006.01)
*H04N 1/00* (2006.01)
*H04N 1/028* (2006.01)
*H04N 1/12* (2006.01)

(52) U.S. Cl.
CPC ..... *H04N 1/00554* (2013.01); *H04N 1/00307* (2013.01); *H04N 1/02815* (2013.01); *H04N 1/121* (2013.01)

(58) Field of Classification Search
None
See application file for complete search history.

(56) References Cited

U.S. PATENT DOCUMENTS

| 5,805,272 | A  | * | 9/1998  | Nozawa    | H04N 1/00681 355/25 |
| 7,035,011 | B2 | * | 4/2006  | Wolf      | G03B 21/10 359/363 |
| 7,173,628 | B1 | * | 2/2007  | Kawai     | H04N 1/00127 345/531 |
| 7,626,634 | B2 | * | 12/2009 | Ohki      | F16M 11/10 348/207.1 |
| 7,751,092 | B2 | * | 7/2010  | Sambongi  | H04N 1/0035 358/474 |
| 8,137,010 | B2 | * | 3/2012  | Yoshida   | G03B 17/00 396/428 |
| 8,559,063 | B1 | * | 10/2013 | Booppanon | G03B 17/561 358/302 |
| D699,242  | S  | * | 2/2014  | Hu        | D14/423 |
| 9,137,414 | B2 | * | 9/2015  | Shen      | H04N 1/0057 |
| 9,280,036 | B2 | * | 3/2016  | Kasahara  | G03B 17/561 |

(Continued)

*Primary Examiner* — Cheukfan Lee
(74) *Attorney, Agent, or Firm* — Lin & Associates Intellectual Property, Inc.

(57) ABSTRACT

A mobile device holding device comprises a basement including an inner accommodation space; a document feeding path including a scanning area, the document feeding path being disposed in said accommodation space; an input tray disposed on an upstream of the document feeding path to accommodate documents to be scanned; an output tray disposed on a downstream of the document feeding path to eject scanned documents; a document feeding unit disposed in the accommodation space for transmitting documents through the document feeding path; and a device holder disposed on the basement to fix a mobile device; wherein the device holder is moved to align the mobile device with the scanning area for capturing the image within the scanning area, and ensuring that the shooting area of the mobile device is not less than the width of documents to be scanned.

2 Claims, 7 Drawing Sheets

(56) References Cited

U.S. PATENT DOCUMENTS

| | | | | |
|---|---|---|---|---|
| 9,325,909 B2* | 4/2016 | Kasahara | ............. | H04N 5/2354 |
| 9,350,894 B2* | 5/2016 | Kasahara | ........... | H04N 1/19594 |
| 9,491,344 B2* | 11/2016 | Takabatake | .......... | H04N 5/2256 |
| 9,794,520 B2* | 10/2017 | Kuroda | .................... | G06K 9/18 |
| 9,880,450 B2* | 1/2018 | Yamakose | ............ | G03B 17/561 |
| 10,033,901 B1* | 7/2018 | Gnanadevalu | ....... | H04N 1/1061 |
| 2007/0035655 A1* | 2/2007 | Chen | ........................ | H04N 1/04 |
| | | | | 348/373 |
| 2009/0002548 A1* | 1/2009 | Liang | ................ | H04N 1/00519 |
| | | | | 348/373 |
| 2010/0290717 A1* | 11/2010 | Hsu | ..................... | F16M 11/045 |
| | | | | 382/312 |
| 2014/0160350 A1* | 6/2014 | Takabatake | ............ | H04N 5/247 |
| | | | | 348/376 |
| 2015/0271412 A1* | 9/2015 | Aono | ................ | H04N 5/23293 |
| | | | | 348/241 |
| 2015/0271451 A1* | 9/2015 | Hayashi | ................ | G03B 15/03 |
| | | | | 348/77 |

* cited by examiner

HOLDING DEVICE FOR MOBILE DEVICE

BACKGROUND OF THE INVENTION

1. Field of the Invention

The present invention relates to a holding device for mobile device, in particular to a holding device capable of feeding documents continuously.

2. The Related Art

Traditionally, to copy and store physical documents, both a scanner and a computer are necessary. The contents of documents are scanned with the scanner and then transferred to the computer for changing the format and storing. However, for a light user who only scans a few documents per day, it is not the most economical solution to purchase a scanner. On the other hand, using a mobile device such as a smartphone to photograph documents is a more reasonable compromise. However, the quality of the images captured by the mobile device is usually not as good as expected due to hand shaking or document separation from the focus plane. Besides, shooting documents page by page manually is inefficient while dealing with a large number of documents. A variety of factors make the image quality and convenience of scanning with mobile devices far less than with conventional scanners.

SUMMARY OF THE INVENTION

An objective of the present invention is to provide a holding device for mobile device, in particular to a holding device which is capable of feeding documents continuously.

To achieve the objective, the present invention includes the following contents:

A holding device for mobile device comprises: a basement provided with an interior accommodating space; a document feeding path disposed in said accommodating space, said document feeding path including a scanning area; an input tray disposed on the upstream of said document feeding path to accommodate documents to be scanned; an output tray disposed on the downstream of said document feeding path to eject scanned documents; a document feeding unit disposed in said accommodating space to drive said documents to be scanned through said document feeding path; a device holder disposed on said basement to fix a mobile device; wherein said device holder is moved to align said mobile device to capture the image of said scanning area, and ensure that the shooting area of said mobile device is wider than the width of said document to be scanned.

In a preferred embodiment, said holding device for mobile device further comprises an illuminating unit disposed on said device holder for illuminating said scanning area.

In a preferred embodiment, a supporting member is disposed between said device holder and said basement for connecting said device holder and said basement.

In a preferred embodiment, said supporting member further comprises at least a folding mechanism, said folding mechanism comprising pivot shafts disposed at both ends of said supporting member for respectively connecting said device holder and said basement; a first latching unit pivotally connected to said device holder, the free end of said first latching unit being provided with at least one first latching portion; a first latching notch disposed on the surface of said supporting member to cooperate with said first latching unit for fixing the relative position of said device holder and said supporting member; a second latching unit pivotally connected to said supporting member, the free end of said second latching unit being provided with at least one second latching portion; a second latching notch disposed on the surface of said basement to cooperate with said second latching unit for fixing the relative position of said supporting member and said basement.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

In order to describe the technical content, structural characteristics, reached purpose and effectiveness of the following examples and details are illustrated with the accompanied drawings.

The terms "paper" and/or "document" as used herein include, but not limited to, physical objects containing paper, film, or the like that is used as a carrier to record graphical and/or textual content.

Figure 1:
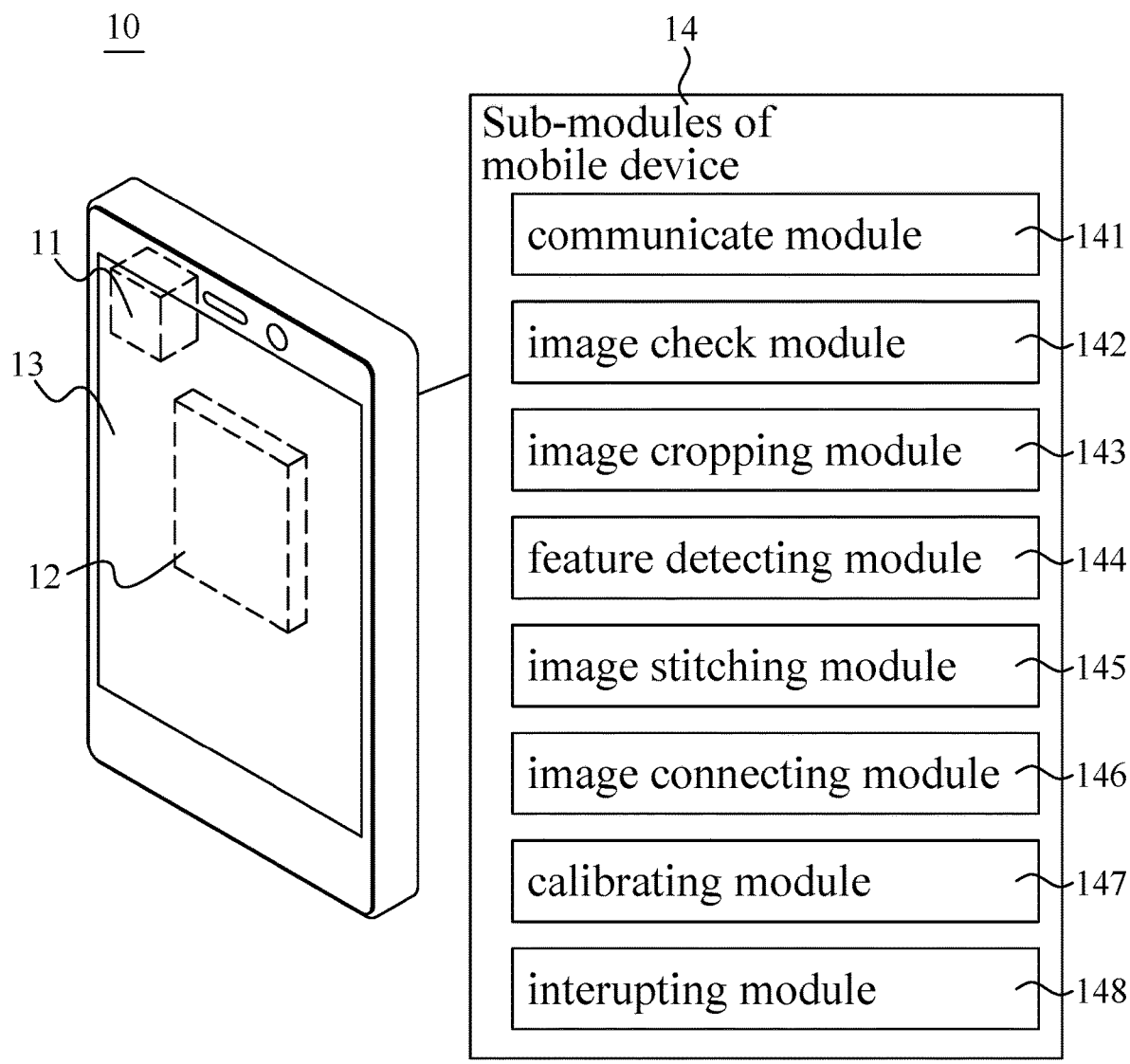
FIG. 1 shows a perspective view and a sub-module diagram of a mobile device in the present creation.
Figure 3:
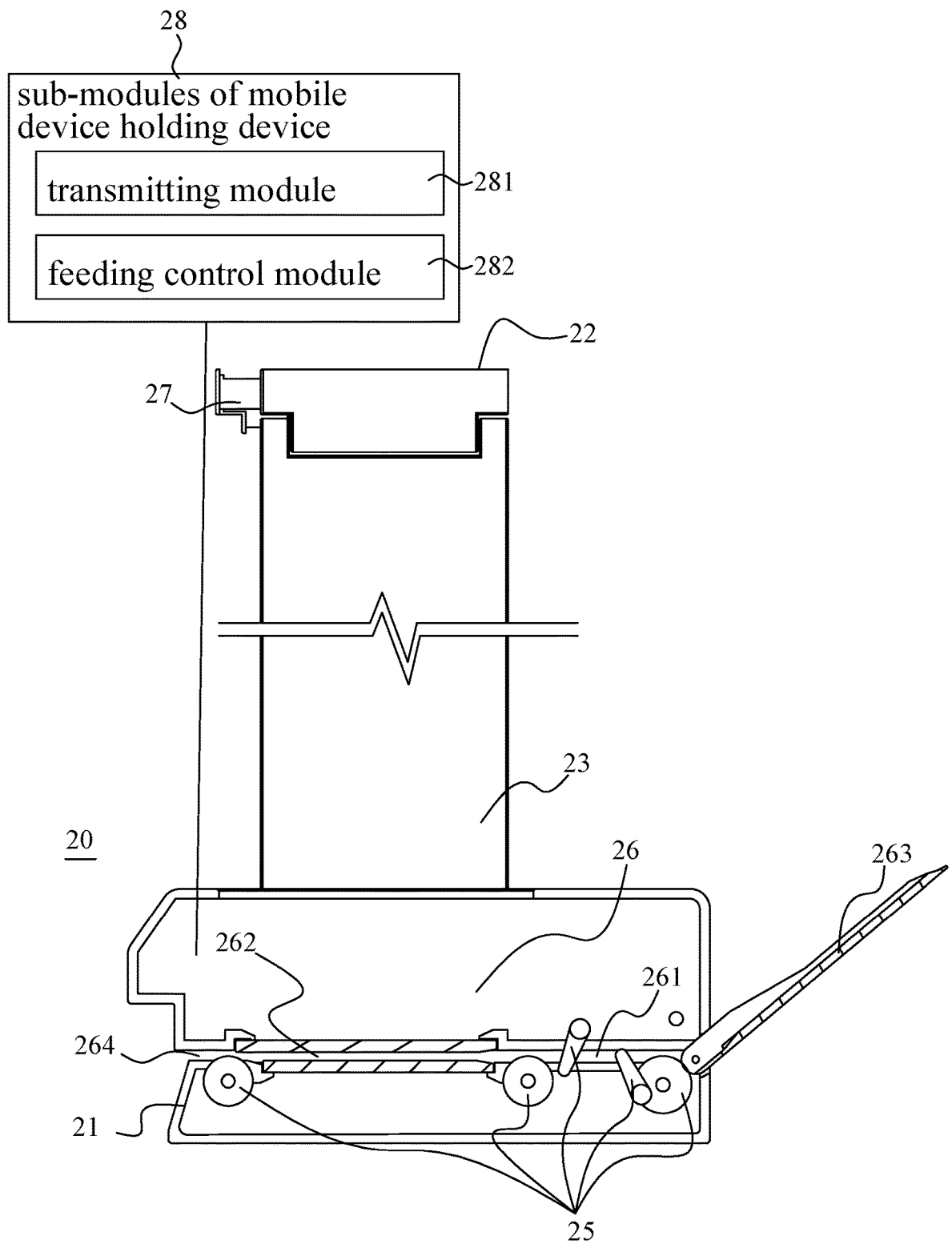
FIG. 3 shows a cross-sectional view and a subsystem diagram of a holding device for mobile device in the present creation.

Referring to FIG. 1 and FIG. 3 now, a holding device 20 in the present invention is used with a mobile device 10 for scanning documents, wherein said holding device 20 and/or said mobile device 10 is provided with a computer readable storage medium having submodules, and said submodules perform a series of operations (described later) while executed.

Said mobile device 10 in the embodiment is a smartphone which includes: an image capturing unit 11 for capturing a document image and temporarily storing it in a native image linkage; an image processing unit 12 for extracting the image stored in the native image linkage and adjusting it correspondingly; and a touch screen panel 13 for displaying information and providing a controlling interface. Said smartphone can also be equipped with additional dedicated or programmable controlling interfaces such as function buttons, selection buttons, joysticks or touchpads, and the technologies and features described above can also be implemented with other image capturing devices 10, including but not limited to computers, personal digital assistants (PDAs), game devices, digital cameras, and the like.

Wherein, said image processing unit 12 includes the following sub-modules 14: a communicate module 141 which receives a message sent by said holding device 20 and activates corresponding sub-modules according to the received message; an image check module 142 that extracts the document image temporarily stored in said native image linkage to check image flaws such as bad exposures, mis-focused, and skewed, and further readjusts parameters of said image capturing unit 11 if any image flaws are detected; an image cropping module 143 that executes the following operations: adjusting the contrast of the document image extracted from said native image linkage, cropping said document image into image blocks by the length of image, storing said image block in a cropped image linkage, and deleting said document image stored in said native image linkage; a feature detecting module 144 which detects and calculates the quantity of feature points in said image block, and activates corresponding sub-modules according to the quantity of feature points; an image stitching module 145 which compares said feature points in each image blocks extracted from said cropped image linkage and matches said feature points existing in each image blocks for stitching said image blocks into a full-page document image by mating feature points; an image connecting module 146 which connects image blocks extracted from said cropped image linkage block by block into a full-page document image; a calibrating module 147 which calculates the relative position between said mobile device 10 and said holding device 20 and shows an instruction message to the user for minimizing the relative position therebetween; and an interrupting module 148 which suspends the scanning process when at least one of abnormal states such as said input tray 263 emptied, and paper jammed in the document feeding path is detected, or a stop command given by user is received.

Said holding device 20 includes: a basement 21 having an inner accommodation space 26 within; a document feeding path 261 disposed in said accommodation space 26, said document feeding path 261 including a scanning area 262; an input tray 263 disposed upstream of said document feeding path 261 to accommodate documents to be scanned; an output tray 264 disposed downstream of said document feeding path 261 to eject scanned documents; a document feeding unit 25 disposed in said accommodation space 26 to drive documents through said document feeding path 261; a device holder 22 disposed on said basement 21 to secure said mobile device 10; and an illuminating unit 27 disposed on said device holder 22 to illuminate said scanning area 262; wherein said device holder 22 is moved to align said mobile device 10 to said scanning area 262 for capturing the image within and ensuring that the shooting area of said mobile device 10 is not shorter than the width of documents to be scanned.

Figure 2:
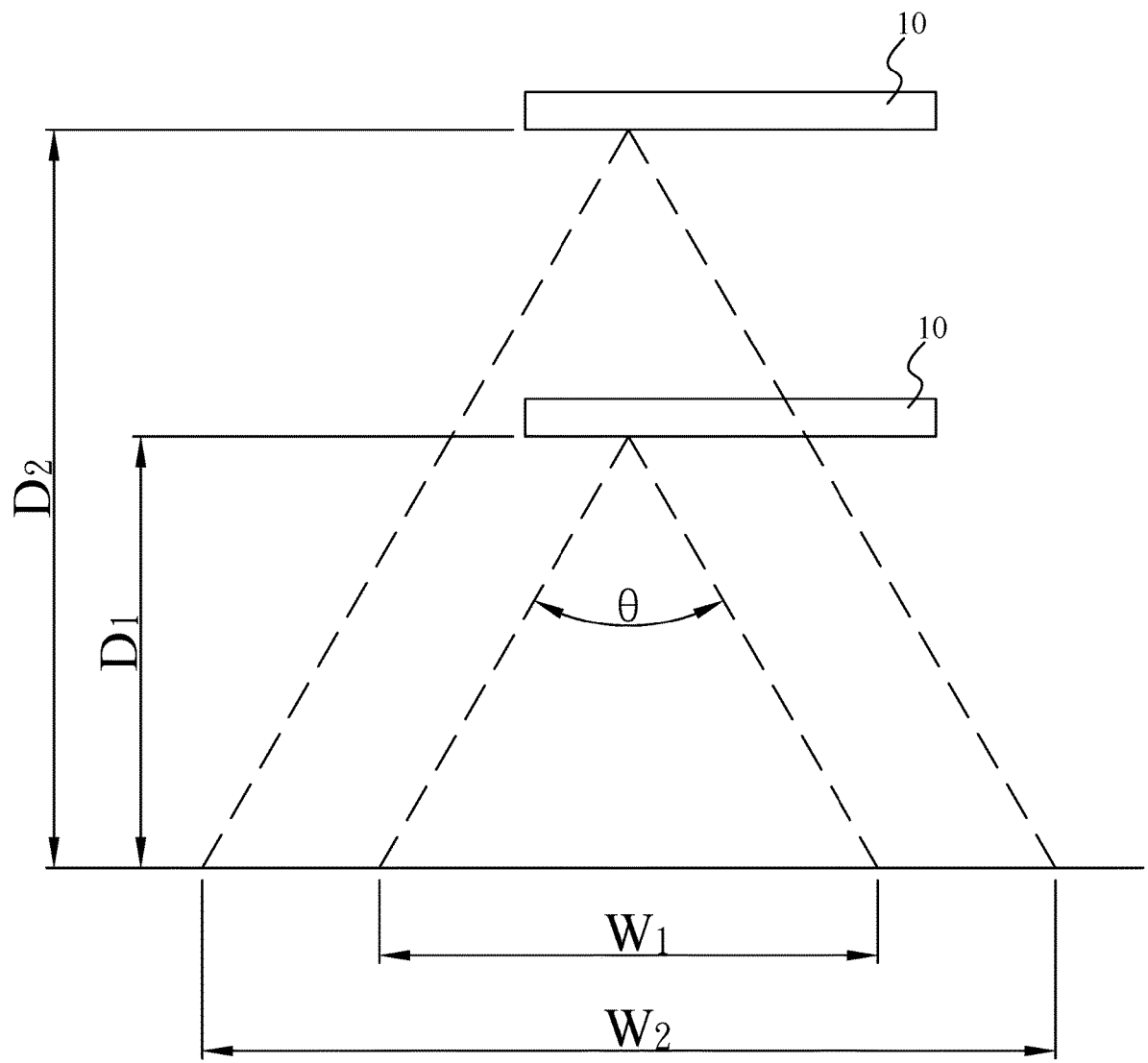
FIG. 2 shows a schematic diagram of the shooting width and shooting distance.

As shown in FIG. 2, the shooting angle θ of a conventional mobile device 10 is fixed, so the distance (D) between said mobile device 10 and said documents to be scanned determines the shooting width (W) that said mobile device 10 is able to capture. When the distance (D) between said mobile device 10 and said documents to be scanned increases, the shooting width (W) increases. And the shooting width (W) and the distance (D) satisfy the following equation W=D*2 tan(θ/2). Therefore, in order to capture the image of the entire document with said mobile device 10, the shooting width (W) must be equal or larger than the width of documents (Wp), and the distance (D) between said mobile device 10 and said documents to be scanned have to be Greater than Wp/2 tan(θ/2).

Referring to FIG. 3, in order to increase said distance (D), a supporting member 23 is arranged between said device holder 22 and said basement 21 to raise said device holder 22, and the length of said supporting member 23 is greater than Wp/2 tan(θ/2) to ensure that said mobile device 10 is capable of capturing the image of the entire documents.

Figure 4:
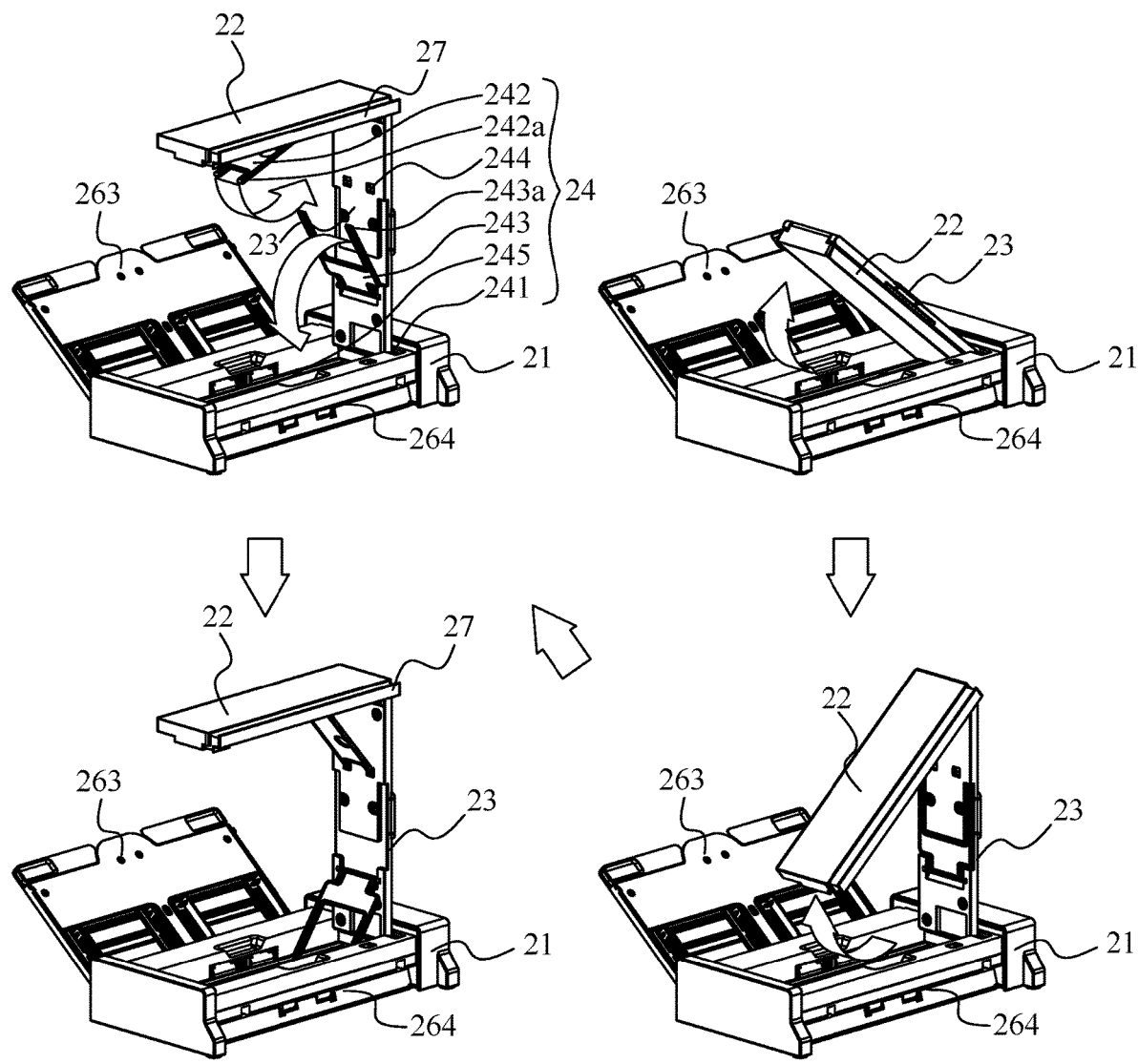
FIG. 4 shows a schematic diagram of the unfolding process of said holding device for mobile device in the present creation.

Referring to FIG. 4, for facilitating storage, said supporting member 23 further comprises a folding mechanism 24 which includes pivot shafts 241 disposed at both ends of said supporting member 23. Said supporting member 23 is connected with said device holder 22 and said basement 21 respectively through said pivot shafts 241; a first latching unit 242 is pivotally connected to said device holder 22, one free end of said first latching unit 242 is provided with at least one first latching portion 242a; a first latching notch 244 is disposed on the surface of said supporting member 23 for cooperating with said first latching unit 242 so as to secure the relative position of said device holder 22 and said supporting member 23; a second latching unit 243 is pivotally connected to said supporting member 23 with a free end which is provided with at least one second latching portion 243a; a second latching notch 245 is disposed on the surface of said basement 21 for cooperating with said second latching unit 243 so as to secure the relative position of said supporting member 23 and said basement 21.

Referring to FIG. 3, said holding device 20 in this preferred embodiment includes the following sub-module of document feeder 28: a signal transmitting module 281 for sending different messages to the image capturing device 10 according to different information needed to be transmitted; a feeding control module 282 for controlling the document feeding unit 25 to feed documents at a constant speed and suspending the feeding progress while any of abnormal states selected from the input tray 263 is emptied, paper jam occurred in the document feeding path 261 and the stop command given by the user is detected.

Figure 5:
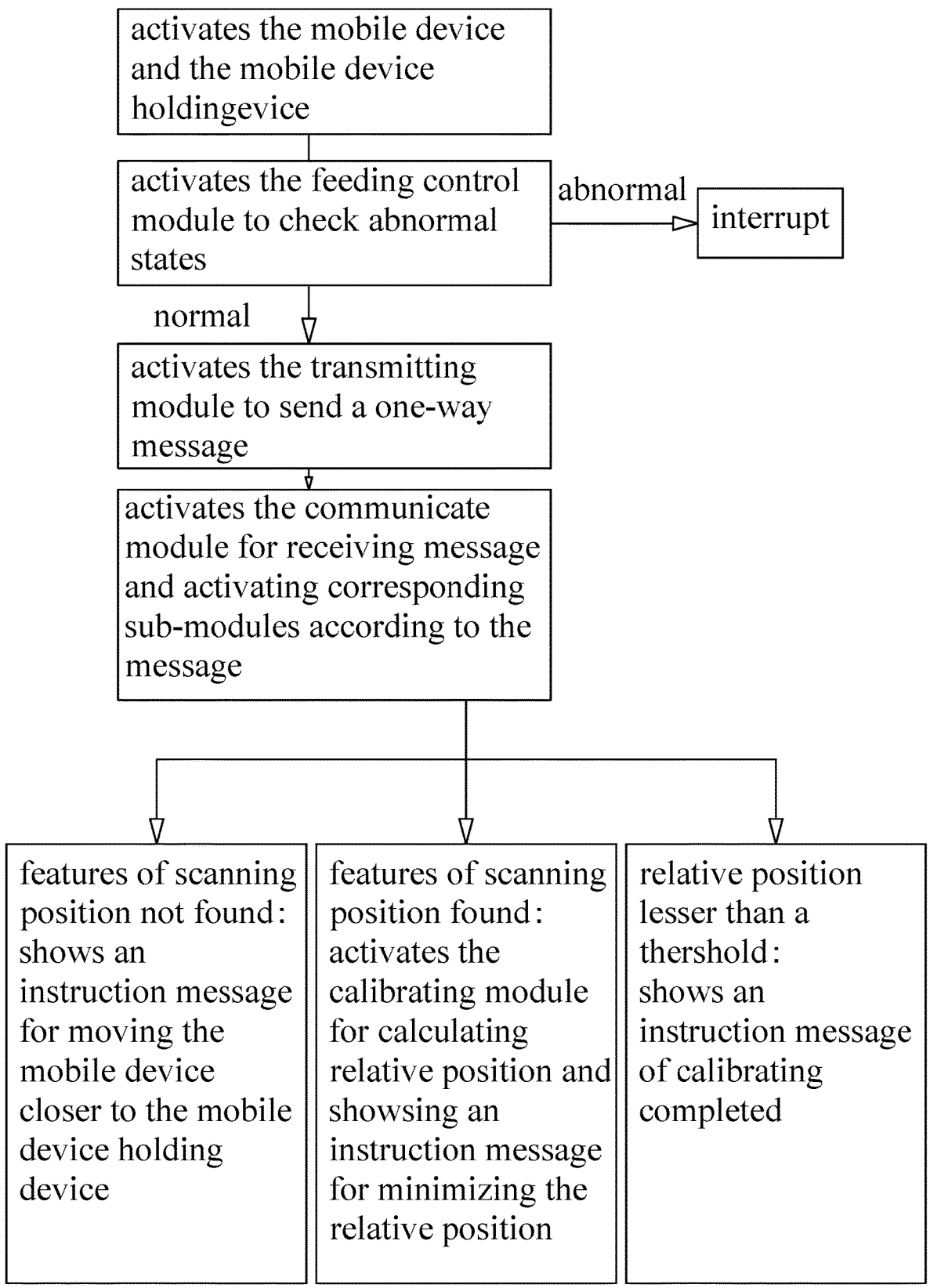
FIG. 5 shows a block diagram of the flow of combining the mobile device with the holding device.

Referring to FIG. 5, the flow of document scanning in the present invention is shown as follow:

First, in order to ensure that said mobile device 10 can correctly capture the image of documents to be scanned, said mobile device 10 is installed to said holding device 20 with the following steps:

The user starts said holding device 20 and said mobile device 10 cooperated with device holding device 20. Said holding device 20 executes said feeding control module 282 while activated to check abnormal states including but not limited to: the input tray 263 emptied and paper jam in the document feeding path 261. If there is no abnormal state being detected, then establishes a private area network between said holding device 20 and said mobile device 10, and said private area network shown in this embodiment is realized by optical image recognition. Said mobile device 10 captures an optical image of said holding device 20 and determines the message by checking said optical image of said holding device 20. Since the capabilities of capturing and processing images have been built into said mobile device 10, there is no need to apply additional devices for receiving or identifying the message in said mobile device 10. Besides, the message sent by said holding device 20 is a one-way message, so said holding device 20 does not wait for any information returned by said mobile device 10. Thus, the communication method here does not use public networks such as the Internet or the cellular network, but only needs to perform one-to-one communication in a short-distance area, it reduces the setting cost of said transmitting module 281.

Then said transmitting module 281 is activated to send message to said mobile device 10 through said private area network. Said transmitting module 281 in this embodiment transmits the message by controlling said illuminating unit to adjust the exposure at the scanning area 223 according to the message needed to send. However, it is just for illustration but not intended to be limiting. Said one-way message can also be sent by adjusting other features including but not limited to texture, pattern, exposure, contrast, and color of the image.

Said mobile device 10 executes said communicate module 141 while activated and said communicate module 141 receives said message by continuously capturing images of said mobile device 10, and further executes one of the following operations according to the received message:

If the received message doesn't contain the feature of said scanning area at all, for example, the image is completely black or shows a pattern/outline other than said holding device 20, said communicate module 141 performs an operation to show an instruction message for asking the user to move said mobile device 10 closer to said holding device 20 on said touch screen panel 13.

If said received message contains the feature of said scanning area, said communicate module 141 executes said calibrating module 147 to calculate the relative position between said mobile device 10 and said holding device 20 and shows an instruction message for asking the user to minimize the relative position thereof on said touch screen panel 13.

If said received message contains the feature of said scanning area, and the relative position between said mobile device 10 and said holding device 20 is calculated to be less than a predetermined threshold by said calibrating module 147, said calibrating module 147 executes an operation to display an indication message that the position correction is completed on said touch screen panel 13.

In conclusion, this embodiment discloses the operation of sending message to said mobile device 10 with said transmitting module 281 through the image that contains features of said scanning area, and determining the relative position between said holding device 20 and said mobile device 10 according to said image that contains features of said scanning area and performing corresponding operations according to said relative position. However, the way that said transmitting module 281 sends a message here is just for illustration and should not be limited to the images that contain features of said scanning area.

Figure 6:
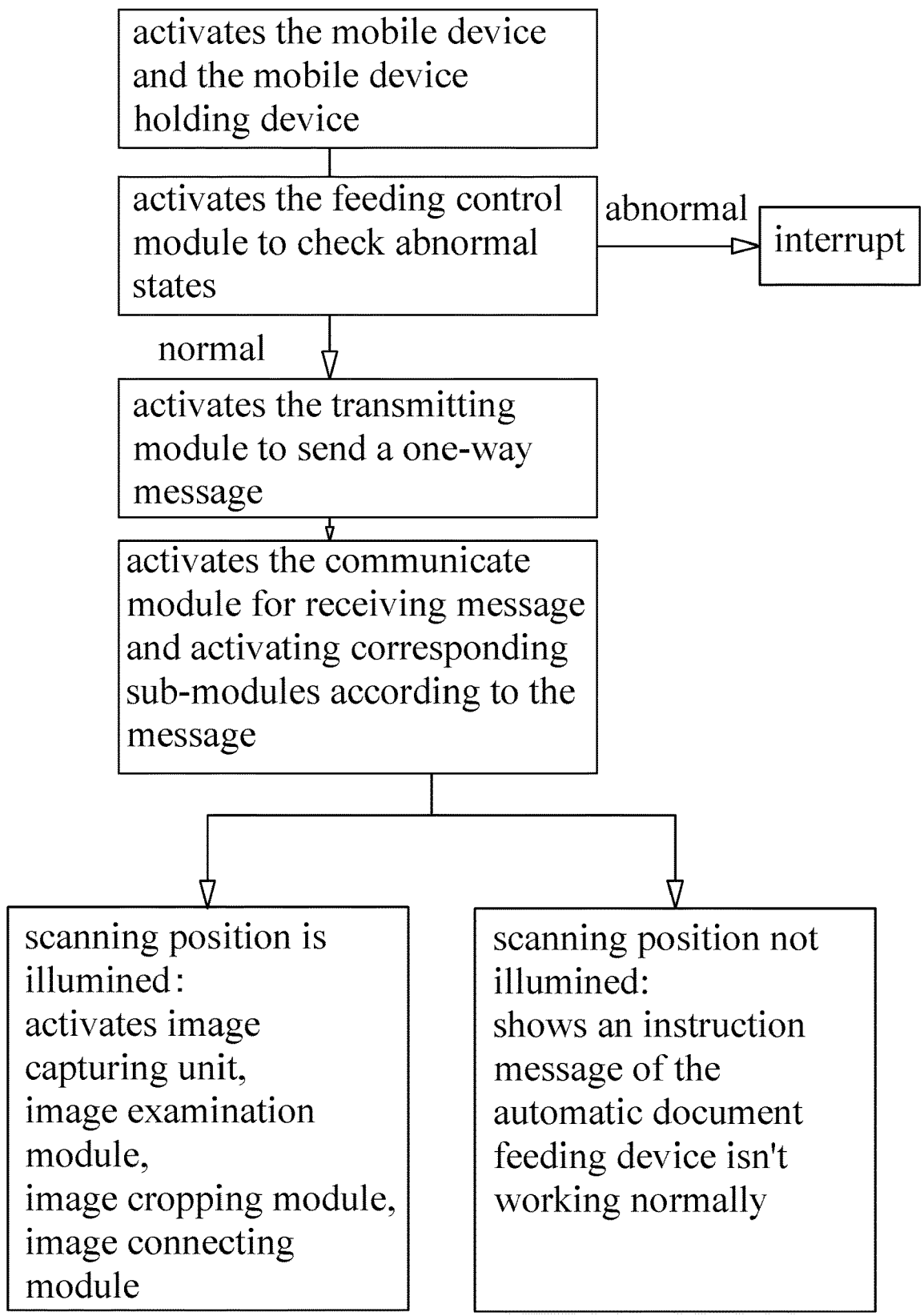
FIG. 6 shows a block diagram of the process of automatic scanning in a preferred embodiment.

Referring to FIG. 6, it shows the process of finishing the assembly of said holding device 20 and said mobile device 10 and preparing to begin scanning. In order to automate the scanning of the multi-page document, said mobile device 10 and said holding device 20 described above are controlled to perform the following steps:

Said holding device 20 activates said feeding control module 282 to check for abnormal states that including, but not limited to: whether there is a document to be scanned in said input tray 263, and whether a paper jam occurs in said document feeding path 261.

If no abnormal state is detected, establishing a private area network between said mobile device 10 and said holding device 20 and activating said transmitting module 281 to send message to said mobile device 10 via said private area network. Said transmitting module 281 in this embodiment performs an operation for controlling said document feeding unit 25 to feed documents at a constant speed and said illuminating unit to illumine said scanning area.

Said mobile device 10 executes said communicate module 141 for receiving a message while activated by capturing images of said scanning area via said image capturing unit 11 at a fixed time interval and performs one of the following operations according to the received message.

If said received message contains the features showing that the scanning area has been illumined, said communicate module 141 controls said image capturing unit 11 to capture images of documents passing through said scanning area at a constant time interval and stores said images to a native image linkage. Simultaneously, said image check module 142, said image cropping module 143, and said image connecting module 146 are activated to perform corresponding operations.

If said received message contains the features showing that the scanning area 223 is not illumined, said communicate module 141 controls said touch screen panel 13 to show an instruction message of said holding device 20 is not operating correctly.

In this embodiment, said holding device 20 sends the message by adjusting features of an optical image of said scanning area and said mobile device 10 determines if said holding device 20 is ready to feed documents according to the exposure of received images. However, the way to send messages here is just for illustrative purposes but not limited to the exposure of the images.

In another feasible embodiment, said transmitting module 281 sends the message via features including but not limited to texture, pattern, and color of the image of said scanning area.

Figure 7:
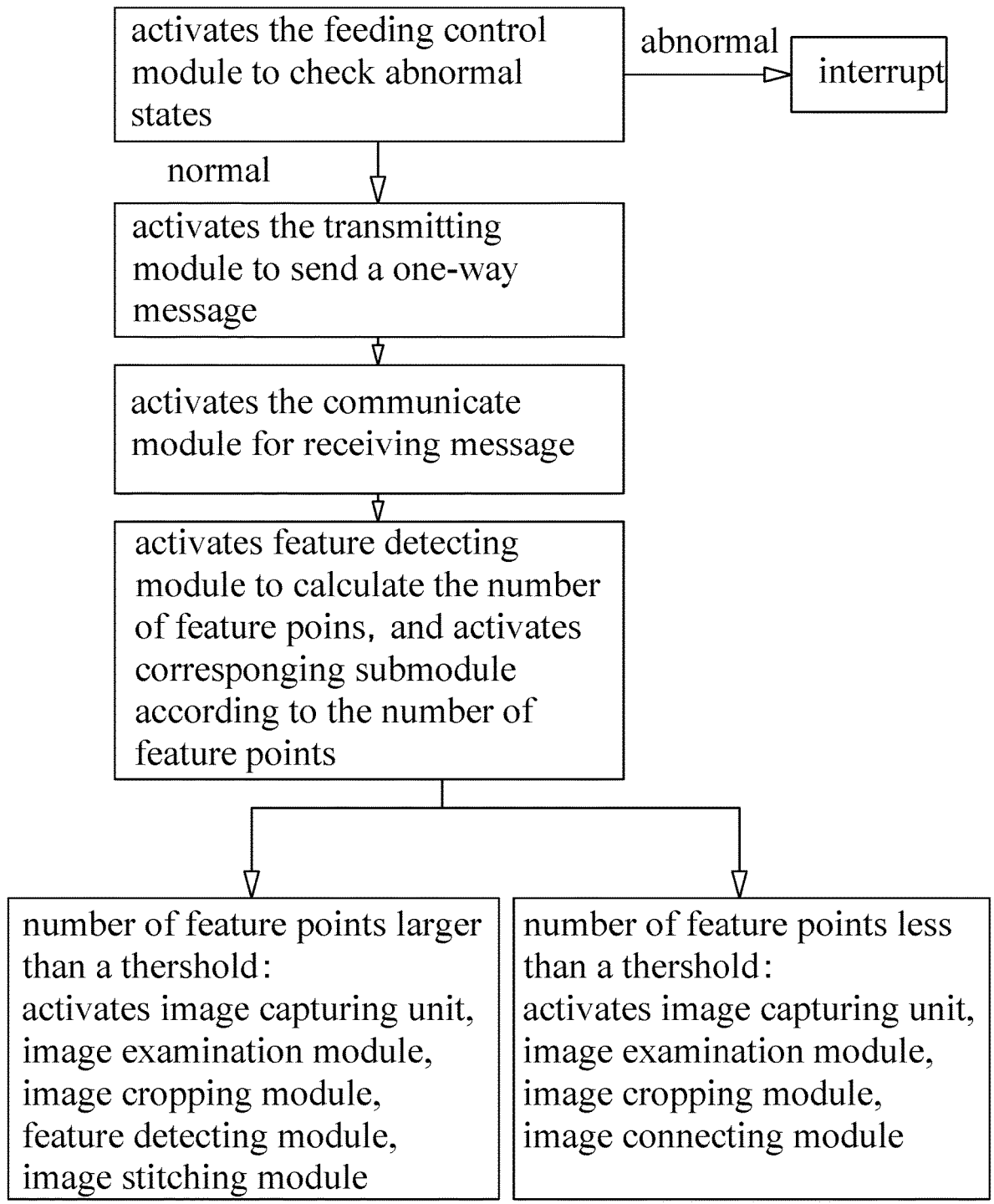
FIG. 7 shows a block diagram of the process of automatic scanning in another embodiment.

Referring to FIG. 7 now, it shows the process of finishing the assembly of said holding device 20 and said mobile device 10 and preparing to begin scanning. In order to automate the scanning of the multi-page document, said mobile device 10 and said holding device 20 are controlled to perform the following operations:

Said holding device 20 activates said feeding control module 282 to check abnormal states including but not limited to said input tray 263 emptied and paper jammed in said document feeding path 261.

If no abnormal states are detected, then establishing the private area network between said mobile device 10 and said holding device 20, and activating said transmitting module 281 to send message to said mobile device 10 via said private area network. The way of said transmitting module 281 to send a message in this embodiment is controlling said document feeding unit 25 to feed the documents at a constant speed and said illuminating unit to illumine said scanning area.

Said mobile device 10 executes said communicate module 141 while activated and said communicate module 141 receives the messages by capturing the images continuously at a fixed time interval with said image capturing unit 11.

Said feature detecting module 144 is activated to find feature points contained in said message and execute one of the following operations according to the number of said feature points:

If the message shows said holding device 20 is ready to feed the documents, and the quantity of feature points in said message is greater than a predetermined threshold, it means the information contained in the message such as patterns, texts or textures is large enough for stitching image blocks together accurately by using feature point comparisons.

In this case, said mobile device 10 controls said image capturing unit 11 to capture an image of documents passing through said scanning area at a fixed time interval and stores it in the native image linkage. Simultaneously, said mobile device 10 activates said image check module 142, said image cropping module 143, said feature detecting module 144 and said image stitching module 145 to perform corresponding operations.

If the quantity of feature points in said message is less than a predetermined threshold, it means the document may contain lots of blank or highly repeating textures, and it would be difficult to stitch image blocks together accurately in this situation. Therefore, the way of connecting said image blocks into a full-page document image is simply connecting each of image blocks block by block.

At this time, said image capturing unit 11 is controlled to capture the image of documents to be scanned that passing through said scanning area at a fixed time interval for acquiring and temporarily storing said image of documents into the native image linkage, and simultaneously executes said image check module 142, said image cropping module 143, and said image connecting module 146 to perform corresponding operations.

In this embodiment, said holding device 20 sends message to said mobile device 10 by adjusting features of said image at said scanning area, and said mobile device 10 executes corresponding operations according to features in said received image. However, it should be noted that said message is for illustrative purposes only and not limited to the number of feature points of the image.

In another feasible embodiment, said transmitting module 281 transmits a message to said mobile device 10 by adjusting features including but not limited to texture, pattern, exposure, and color of the image, and said mobile device 10 performs a corresponding operation in response to said message.

In conclusion, the present invention discloses a holding device 20 for the mobile device 10 and a method of using said holding device 20 to cooperate with the mobile device 10 for scanning multi-page documents, thus achieves convenient carrying and reasonable cost of acquisition.

What is claimed is:

1. A holding device for a mobile device, comprising:
a basement provided with an interior accommodating space;
a document feeding path disposed in said accommodating space, said document feeding path having a scanning area;
an input tray disposed on an upstream of said document feeding path to accommodate documents to be scanned;
an output tray disposed on a downstream of said document feeding path to eject scanned documents;
a document feeding unit disposed in said accommodating space to drive said documents to be scanned through said document feeding path;
a device holder disposed on said basement to fix said mobile device;
a supporting member disposed between said device holder and said basement for connecting said device holder and said basement; and
a folding mechanism comprising pivot shafts disposed at two ends of said supporting member for respectively connecting said device holder and said basement, a first latching unit pivotally connected to said device holder, a free end of said first latching unit being provided with at least one first latching portion, a first latching notch disposed on a surface of said supporting member to cooperate with said first latching unit for fixing a relative position of said device holder and said supporting member, a second latching unit pivotally connected to said supporting member, a free end of said second latching unit being provided with at least one second latching portion, and a second latching notch disposed on a surface of said basement to cooperate with said second latching unit for fixing a relative position of said supporting member and said basement;
wherein said device holder is moved to align said mobile device to capture an image of said scanning area, and ensure a shooting area of said mobile device is wider than a width of said document to be scanned.

2. The holding device for mobile device as claimed in claim 1, further comprising an illuminating unit disposed on said device holder for illuminating said scanning area.

* * * * *